(12) United States Patent
Park

(10) Patent No.: US 12,239,100 B2
(45) Date of Patent: Mar. 4, 2025

(54) BRUSH FOR PETS

(71) Applicant: BMSMILE Co., Ltd., Seoul (KR)

(72) Inventor: Bongsu Park, Seoul (KR)

(73) Assignee: BMSMILE Co., Ltd., Seoul (KR)

( * ) Notice: Subject to any disclaimer, the term of this patent is extended or adjusted under 35 U.S.C. 154(b) by 149 days.

(21) Appl. No.: 17/705,370

(22) Filed: Mar. 27, 2022

(65) Prior Publication Data

US 2022/0211004 A1  Jul. 7, 2022

Related U.S. Application Data

(63) Continuation of application No. PCT/KR2020/011762, filed on Sep. 2, 2020.

(30) Foreign Application Priority Data

Sep. 27, 2019 (KR) .......................... 20-2019-0003961

(51) Int. Cl.
*A01K 13/00* (2006.01)
*A46B 5/02* (2006.01)
(Continued)

(52) U.S. Cl.
CPC .............. *A01K 13/002* (2013.01); *A46B 5/02* (2013.01); *A46B 7/02* (2013.01); *A46B 9/023* (2013.01); *A46B 2200/1093* (2013.01)

(58) Field of Classification Search
CPC .. A01K 13/002; A01K 13/001; A01K 13/003; A01K 13/00; A46B 5/02; A46B 7/02; A46B 9/023; A46B 2200/1093
(Continued)

(56) References Cited

U.S. PATENT DOCUMENTS 172,509 A * 1/1876 Shepard ............... A01K 13/002
15/186
218,812 A * 8/1879 Gawthorpe .......... A01K 13/002
119/612
(Continued)

FOREIGN PATENT DOCUMENTS

JP    S35-016156 B    10/1960
JP    H08-014590 A    1/1996
(Continued)

OTHER PUBLICATIONS

Website [Care] Pethroom (https://blog.naver.com/tkdghk135/221481400428; publication date: Mar. 6, 2019).
(Continued)

*Primary Examiner* — Tye William Abell
*Assistant Examiner* — Maria E Graber
(74) *Attorney, Agent, or Firm* — Studebaker & Brackett PC

(57) ABSTRACT

The present invention relates to a brush for pets that includes a handle part configured to be grasped by a user and a brush part coupled to the handle part and configured to brush pet hair, wherein the brush part includes a floor plate, a comb teeth array which consists of a plurality of comb teeth that extend in a state of being embedded in the floor plate, and a brush shade which is connected to the floor plate and configured to wrap around the comb teeth array, and a height of the brush shade is larger than a height of the comb teeth, and thus, when the brush shade is brought into contact with an epidermis of the pet to perform brushing, a closed space is formed inside the brush shade.

6 Claims, 4 Drawing Sheets

(51) Int. Cl.
*A46B 7/02* (2006.01)
*A46B 9/02* (2006.01)

(58) Field of Classification Search
USPC .......................................... 119/633, 625, 632
See application file for complete search history.

(56) References Cited

U.S. PATENT DOCUMENTS

| | | | | |
|---|---|---|---|---|
| 250,349 A * | 12/1881 | Dole | .................... | A01K 13/002 132/120 |
| 502,233 A * | 7/1893 | Miller | .................... | A01K 13/00 15/236.06 |
| 505,756 A * | 9/1893 | Dushane | .............. | A01K 13/002 119/633 |
| 630,686 A * | 8/1899 | Grant et al. | ......... | A01K 13/002 119/631 |
| 804,680 A * | 11/1905 | Smith | .................... | A46B 9/023 2/20 |
| 1,770,749 A * | 7/1930 | Axel | .................... | A01K 13/002 604/315 |
| 2,017,780 A * | 10/1935 | Walters | ................ | A01K 13/002 119/606 |
| 2,075,964 A * | 4/1937 | Teigeler | ................ | A01K 13/002 401/137 |
| 2,544,406 A * | 3/1951 | Weems | ..................... | D06F 3/00 119/633 |
| 2,780,829 A * | 2/1957 | Cohen | ....................... | A47L 9/02 15/365 |
| 4,040,390 A * | 8/1977 | Rosenbaum | ......... | A01K 13/002 15/236.08 |
| 4,343,265 A * | 8/1982 | Belschner | ............ | A01K 13/002 119/633 |
| 4,617,875 A * | 10/1986 | Holland | ................ | A01K 13/003 401/281 |
| 4,995,344 A * | 2/1991 | Olson | .................. | A01K 13/002 119/603 |
| 5,649,502 A * | 7/1997 | Frank | .................... | A01K 13/002 401/289 |
| 6,267,305 B1 * | 7/2001 | Kondo | .................. | B05B 1/1618 239/428.5 |
| 7,509,925 B2 * | 3/2009 | Embry | ................. | A01K 13/001 119/603 |
| 7,694,687 B2 * | 4/2010 | Hurwitz | ............... | A01K 13/003 15/186 |
| 8,555,819 B1 * | 10/2013 | McFarland | .......... | A01K 13/001 119/664 |
| 10,512,324 B2 * | 12/2019 | Roundtree | ............. | A46B 11/06 |
| 2002/0029749 A1 * | 3/2002 | Berman | ................ | A01K 13/002 119/628 |
| 2015/0059656 A1 * | 3/2015 | Jui-Tsang | ............... | A46B 17/06 15/160 |
| 2016/0206086 A1 * | 7/2016 | Boyko | ................... | A46B 7/023 |
| 2017/0265431 A1 * | 9/2017 | Urso | ...................... | B25G 1/102 |
| 2018/0110202 A1 * | 4/2018 | Michael | ............... | A01K 13/002 |

FOREIGN PATENT DOCUMENTS

| | | | |
|---|---|---|---|
| JP | H10-108722 A | | 4/1998 |
| JP | 2001129438 A | * | 5/2001 |
| JP | 2005-270615 A | | 10/2005 |
| JP | 2009240768 A | * | 10/2009 |
| JP | 2011130752 A | * | 7/2011 |
| JP | 2012030063 A | * | 2/2012 |
| JP | 2017-118905 A | | 7/2017 |
| JP | 2021-019582 A | | 2/2021 |
| KR | 20-0319818 Y | | 7/2003 |
| KR | 2015-0012394 A | | 2/2015 |
| KR | 10-2017265 B | | 8/2019 |

OTHER PUBLICATIONS

An Office Action; "Notice of Reasons for Refusal," mailed by the Japanese Patent Office on Nov. 8, 2022, which corresponds to Japanese Patent Application No. 2022-507524 and is related to U.S. Appl. No. 17/705,370.

* cited by examiner

BRUSH FOR PETS

CROSS-REFERENCE TO RELATED APPLICATIONS

The present application is a continuation of International Patent Application No. PCT/KR2020/011762, filed Sep. 2, 2020, which is based upon and claims the benefit of priority to Korean Utility Model Registration Application No. 20-2019-0003961, filed on Sep. 27, 2019. The disclosures of the above-listed applications are hereby incorporated by reference herein in their entirety.

TECHNICAL FIELD

The present invention relates to a brush for grooming hair of a pet such as a dog or a cat, and more particularly, to a structure of a brush for pets that allows brushing to be performed so that hair falling out during grooming of a pet's hair does not scatter to surroundings.

BACKGROUND ART

Nowadays, many people view their pet as a companion and a member of the family, and the number of people raising pets is increasing every year. People raising pets spend a considerable amount of time and money for healthcare, hygiene care, beauty care, etc. for their pets. Common brushes have been used for grooming a pet's hair after bathing the pet or managing annual shedding of the pet, but there have been problems in that hair falling out due to combing scatters or gets stuck between comb teeth and gets tangled, making it inconvenient to use the brush, and the hair scatters all over the room, making the house messy and harming the health of the person raising the pet.

Also, conventional brushes for pets are made of an iron material and have sharp bristles and thus are not suitable for pets due to causing pain and wounds when combing.

In order to address such problems, a vibration motor is used as in Patent Document 1 (Korean Unexamined Patent Application Publication No. 2015-0012394), or a brush is connected to a vacuum cleaner to immediately absorb the hair that falls out during combing and prevent scattering of the hair as in Patent Document 2 (Korean Patent Registration No. 10-2017265) and Patent Document 3 (Korean Utility Model Registration No. 20-0319818).

However, in Patent Documents 1 to 3, a driving means such as a vibration motor or a vacuum cleaner must be included to suction pet hair, and a complex structure for connecting the brush to the motor device or vacuum cleaner must be included, causing a manufacturing process to become complicated and costs to be increased.

That is, the brushes for pets of Patent Documents 1 to 3 all have a structure in which an inner side of a body portion is formed to be hollow for a suction port connected to the vacuum cleaner or vibration motor to be formed therein and comb teeth are formed around the suction port. In a brush (100) having such a structure, typically, comb teeth (120) are formed to protrude significantly more than a body portion (110) as illustrated in FIG. 6, or the comb teeth (120) are formed inward from the body portion (110) or formed to be coplanar therewith as illustrated in FIG. 7.

However, the brushes (100) having the structure illustrated in FIG. 6 or 7 make the house messy and harm the health of the person raising the pet because, unless pet hair is suctioned through a suction port using a vacuum cleaner or a vibration motor when grooming the pet hair using the brush, the pet hair falling off the skin scatters outside the brush and all over the room.

Therefore, there is demand for a technical alternative that prevents pet hair from easily scattering when being groomed using a manual brush that does not include a hair suctioning means such as a vibration motor or a vacuum cleaner.

DISCLOSURE

Technical Problem

The first objective of the present invention is to provide a brush for pets that has a structure capable of preventing pet hair that falls off the epidermis during grooming from scattering outside the brush.

In particular, the first objective of the present invention is achieved just by changing the structure of a brush without using an artificial hair suctioning means such as a vibration motor or a vacuum cleaner.

The second objective of the present invention is to provide a brush for pets that facilitates combing of pet hair when grooming the pet hair, helps keep the pet's hair and skin healthy, and allows the pet to feel as comfortable as possible without refusing to comb the hair.

The third objective of the present invention is to provide a brush for pets that has a structure allowing brushing to be smoothly performed while preventing hair from scattering to the outside.

The fourth objective of the present invention is to provide a brush for pets that has a handle structure which makes it comfortable for a user to grasp the brush.

Technical Solution

A first aspect according to the present invention relates to a brush for pets which is a brush for grooming pet hair, the brush including a handle part configured to be grasped by a user and a brush part coupled to the handle part and configured to brush the pet hair.

The brush part of the brush for pets according to the first aspect includes a floor plate, a comb teeth array which consists of a plurality of comb teeth that extend in a state of being embedded in the floor plate, and a brush shade which is connected to the floor plate and configured to wrap around the comb teeth array. Here, a height of the brush shade is larger than a height of the comb teeth. Thus, when the brush shade is brought into contact with an epidermis of the pet to perform brushing, a closed space is formed inside the brush shade.

In the brush for pets of a second aspect according to the present invention, one or more first protrusions may be formed on an upper surface of the comb teeth.

In the brush for pets of a third aspect according to the present invention, one or more second protrusions may be formed on an end surface of the brush shade.

In the brush for pets of a fourth aspect according to the present invention, the brush shade may wrap around the comb teeth array in an elliptical shape, and a length of the second protrusions at a long-axis portion of the brush shade may be larger than a length of the second protrusions at a short-axis portion of the brush shade.

In the brush for pets of a fifth aspect according to the present invention, the comb teeth, the first protrusions, the second protrusions, and the brush shade may be made of a flexible material that is elastically deformable.

In the brush for pets of a sixth aspect according to the present invention, the brush shade may include a connecting part which extends to be connected to the floor plate and a cover part which extends from the connecting part to wrap around the comb teeth array and expands with a progressively increasing diameter, wherein the second protrusions are formed on an end surface of the cover part.

In the brush for pets of a seventh aspect according to the present invention, the handle part may include a handle which is configured to be grasped by the user in a state in which the user's palm is placed thereon and a fixed anchor which is configured to allow the user's hand placed on the handle to be adhered and fixed to the brush.

In the brush for pets of an eighth aspect according to the present invention, the fixed anchor may be formed in the shape of a nail having a shank and a head, and the fixed anchor may be fitted between an index finger and a middle finger of the user, which are placed on the handle, to fix the user's hand.

In the brush for pets of a ninth aspect according to the present invention, the handle may have an elongated shape like a brim of a hat so as to be suitable to be held by the user's palm.

Advantageous Effects

A brush according to the present invention traps pet hair, which falls off the epidermis due to combing when brushing the pet hair, inside the brush to prevent the pet hair from scattering outside the brush. Thus, the hair falling off the pet neither causes damage to the surrounding environment nor harms the user's hygiene.

Unlike the related art, the brush according to the present invention does not require a separate electrically-driven means for suctioning hair. Accordingly, the structure of the brush can be simplified, and thus manufacturing costs can be significantly lowered.

Also, the brush according to the present invention can maximize a massage function by properly inducing friction against the skin, etc. of the pet. Also, since the brush according to the present invention can be used regardless of a direction of texture during brushing, user convenience is significantly improved.

In addition, the brush according to the present invention has triple protrusions formed on an end surface (upper surface) of comb teeth, thereby removing dead hair embedded deep in the pet skin.

DESCRIPTION OF DRAWINGS

The following drawings attached to this specification illustrate preferred embodiments of the present invention and serve to allow a better understanding of the technical spirit of the present invention together with the detailed description of the invention which will be given below, and thus the present invention should not be construed as being limited to details illustrated in the drawings.

MODES OF THE INVENTION

Figure 1:
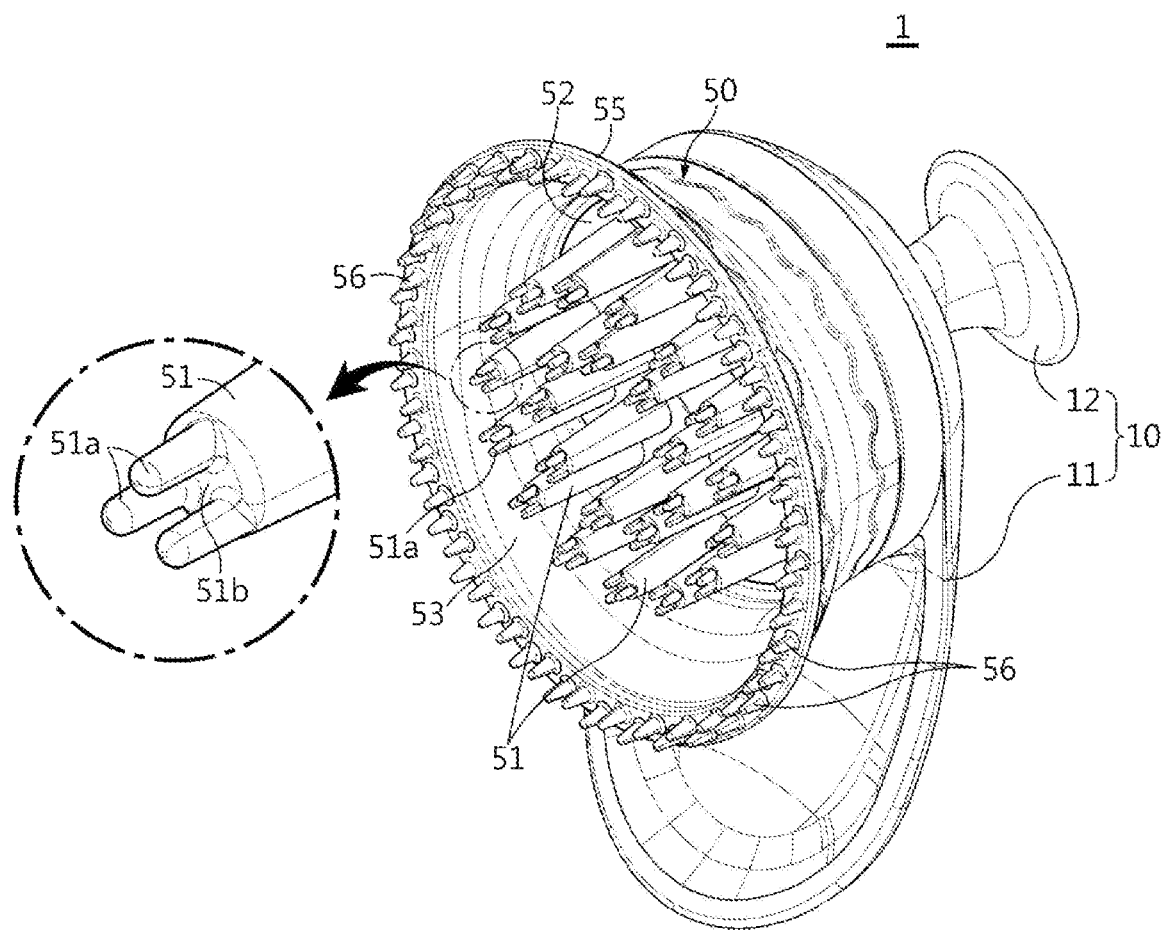
FIG. 1 is a perspective view of a brush for pets according to one preferred embodiment of the present invention.

Hereinafter, embodiments of the present invention will be described in more detail with reference to the accompanying drawings. The embodiments of the present invention may be modified in various forms, and the scope of the present invention should not be construed as being limited to the following embodiments. The embodiments described herein are provided to more thoroughly describe the present invention to those of ordinary skill in the art. In addition, although specific terms have been used in the drawings and the specification of the present invention, the terms are only used for the purpose of describing the present invention and are not used to limit meanings or limit the scope of the present invention described in the claims. Therefore, those of ordinary skill in the art should understand that various modifications and other equivalent embodiments are possible from the embodiments described herein. Accordingly, the true technical scope of the present invention should be determined by the technical spirit of the appended claims.

Hereinafter, preferred embodiments of the present invention will be described in detail with reference to the accompanying drawings. The accompanying drawings are not drawn to scale, and like reference numerals in each drawing denote like elements.

Figure 2:
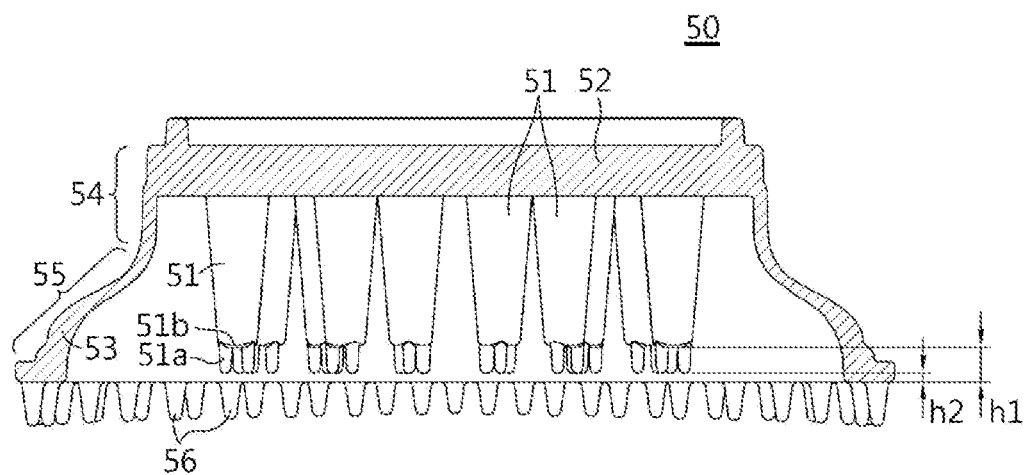
FIG. 2 is a longitudinal cross-sectional view of a brush part of the brush for pets according to one preferred embodiment of the present invention.
Figure 3:
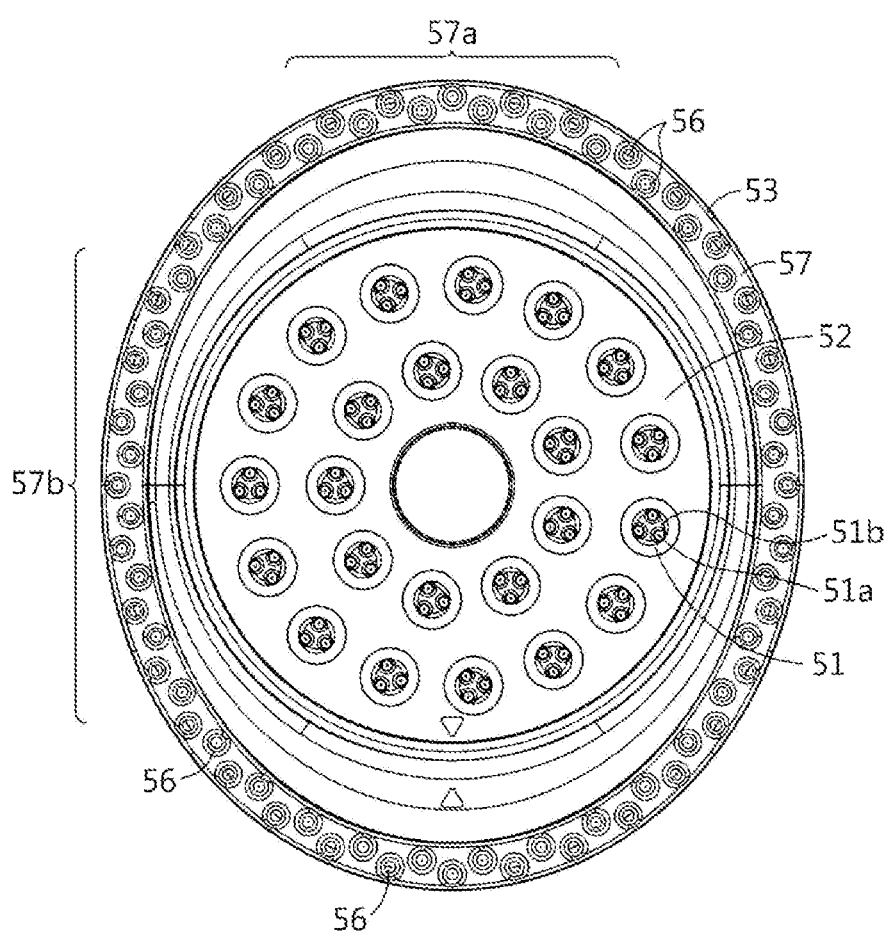
FIG. 3 is a bottom view of the brush part of the brush for pets according to one preferred embodiment of the present invention.

FIG. 1 is a perspective view of a brush for pets according to one preferred embodiment of the present invention, FIG. 2 is a longitudinal cross-sectional view of a brush part of the brush for pets according to one preferred embodiment of the present invention, and FIG. 3 is a bottom view of the brush part of the brush for pets according to one preferred embodiment of the present invention.

Referring to FIGS. 1 to 3, a brush 1 of the present invention mainly consists of a handle part 10 which is configured to be grasped by a user for brushing and a brush part 50 which is configured to groom pet hair. Preferably, the handle part 10 and the brush part 50 may be made of different materials and detachably coupled to each other. That is, preferably, the handle part 10 may be made of a hard plastic material which is highly durable, and the brush part 50 may be made of a soft flexible material which has excellent elastic deformability.

Referring back to FIG. 1, the handle part 10 includes a handle 11 which is configured to be grasped by the user in a state in which the user's palm is placed thereon and a fixed anchor 12 which is configured to allow the user's hand placed on the handle 11 to be adhered and fixed to the brush 1. Preferably, the handle 11 may have an elongated shape like a brim of a hat so as to be suitable to be held by the user's palm. Here, the fixed anchor 12 is fitted between an index finger and a middle finger of the user and fixed to prevent the user's hand from sliding or falling. Accordingly, it is preferable that the fixed anchor 12 has the shape of a nail having a head and a shank.

The brush part 50 is a part for brushing the pet hair in a state of being in contact with the epidermis of the pet and is detachably coupled to the handle part 10. The brush part 50 includes a floor plate 52 in which a comb teeth array including a plurality of comb teeth 51 is embedded and a brush shade 53 which is configured to wrap around the comb teeth array. The comb teeth 51 are installed by being embedded in the floor plate 52, and preferably, the comb teeth 51 may be disposed in a form encircling a central portion of the floor plate 52. Referring to FIG. 3, the plurality of comb teeth 51 form the comb teeth array as two rows of the comb teeth 51 encircle the central portion of the floor plate 52.

Referring to FIG. 2, the comb teeth 51 each have a substantially trapezoidal cross-sectional shape that extends while a base side thereof is placed on the floor plate 52. One or more first protrusions 51a are formed as a plurality of first protrusions 51a on an upper surface 51b of each of the comb teeth 51. Preferably, the length, size, or the like of the plurality of first protrusions 51a may be the same.

Also, the brush shade 53 is formed to be connected to the floor plate 52 and wrap around the entire comb teeth array. As illustrated in FIG. 2, the brush shade 53 includes a connecting part 54 which extends to be connected to the floor plate 52, a cover part 55 which extends from the connecting part 54 to wrap around the comb teeth array and expands with a progressively increasing diameter, and a plurality of second protrusions 56 which are formed on an end surface 57 of the cover part 55.

As illustrated in FIG. 3, the brush shade 53 is formed in an elliptical shape having a long axis and a short axis. A height (length) of the second protrusions 56 formed at a long-axis portion 57a is larger than a height (length) of the second protrusions 56 formed at a short-axis portion 57b.

Also, the comb teeth 51 are embedded in the floor plate 52 to have a height that allows the comb teeth 51 to be constantly spaced apart from the end surface 57 of the brush shade 53 toward the floor plate 52. That is, the height of the comb teeth 51 should be smaller than the height of the brush shade 53. Thus, as illustrated in FIG. 2, a certain gap h1 is formed between the upper surface 51b of the comb teeth 51 and the end surface 57 of the brush shade 53. Also, a certain gap h2 is formed between the first protrusions 51a of the comb teeth 51 and the end surface 57 of the brush shade 53. Accordingly, when the end surface 57 of the brush shade 53 is brought into contact with the epidermis of the pet for use of the brush 1, the comb teeth 51 on which the first protrusions 51a are formed are not exposed to the outside of the brush shade 53.

Also, preferably, the brush shade 53, the comb teeth 51, and the first and second protrusions 51a and 56 may all be formed of the same flexible silicone material, but the materials thereof may not necessarily be the same as long as the materials have flexibility.

Figure 4:
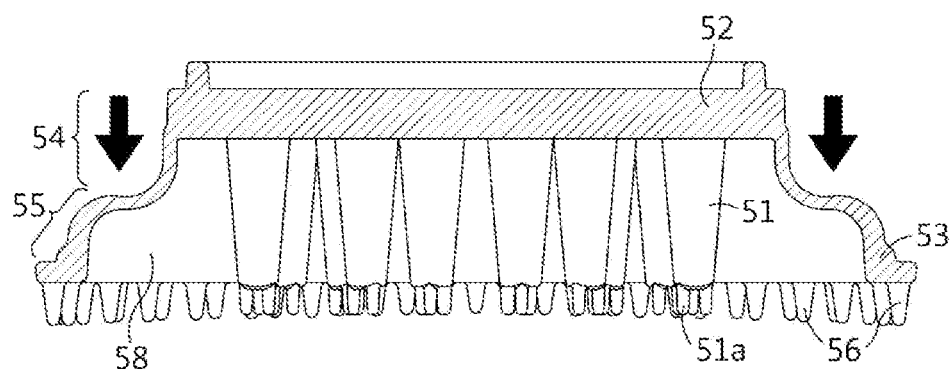
FIG. 4 is a cross-sectional view illustrating a deformed state of the brush part during use of the brush for pets according to one preferred embodiment of the present invention.

The first protrusions 51a and second protrusions 56 serve to come in direct contact with the pet skin to comb and groom the pet hair. Also, during the grooming of the pet hair, the end surface 57 of the cover part 55 of the brush shade 53 comes into contact with the epidermis of the pet, and thus a closed space 58 is formed inside the brush shade 53. In the state in which the closed space 58 is formed, when the brush 1 is pressed toward the epidermis of the pet as illustrated in FIG. 4, the cover part 55 of the brush shade 53 is pressed and widens outward, causing the gaps h1 and h2 to be eliminated and the first protrusions 51a of the comb teeth 51 to come into contact with the epidermis of the pet. In this state, when the user moves the brush 1 to brush the pet hair, the hair that falls off the epidermis due to being groomed by the comb teeth 51 and the first protrusions 51a is trapped inside the closed space 58 instead of falling out of the brush shade 53. Thus, the amount of hair scattering to the surroundings due to brushing may be minimized, which is not only favorable in terms of environment but also safe in terms of hygiene.

Also, due to the presence of the second protrusions 56, additional brushing is possible by the second protrusions 56 while friction between the epidermis of the pet and the end surface 57 of the cover part 55 of the brush shade 53 is reduced. Also, since the brush shade 53 has an elliptical shape as illustrated in FIG. 3, when the user applies force to perform brushing, a force acting on the long-axis portion 57a is larger than a force acting on the short-axis portion 57b. Accordingly, it is preferable that the length of the second protrusions 56 formed at the long-axis portion 57a of the brush shade 53 is larger than the length of the second protrusions 56 formed at the short-axis portion 57b of the brush shade 53.

A process of brushing pet hair using the brush 1 according to one preferred embodiment of the present invention having the above-described configurations will be described with reference to FIGS. 4 and 5.

Figure 5:
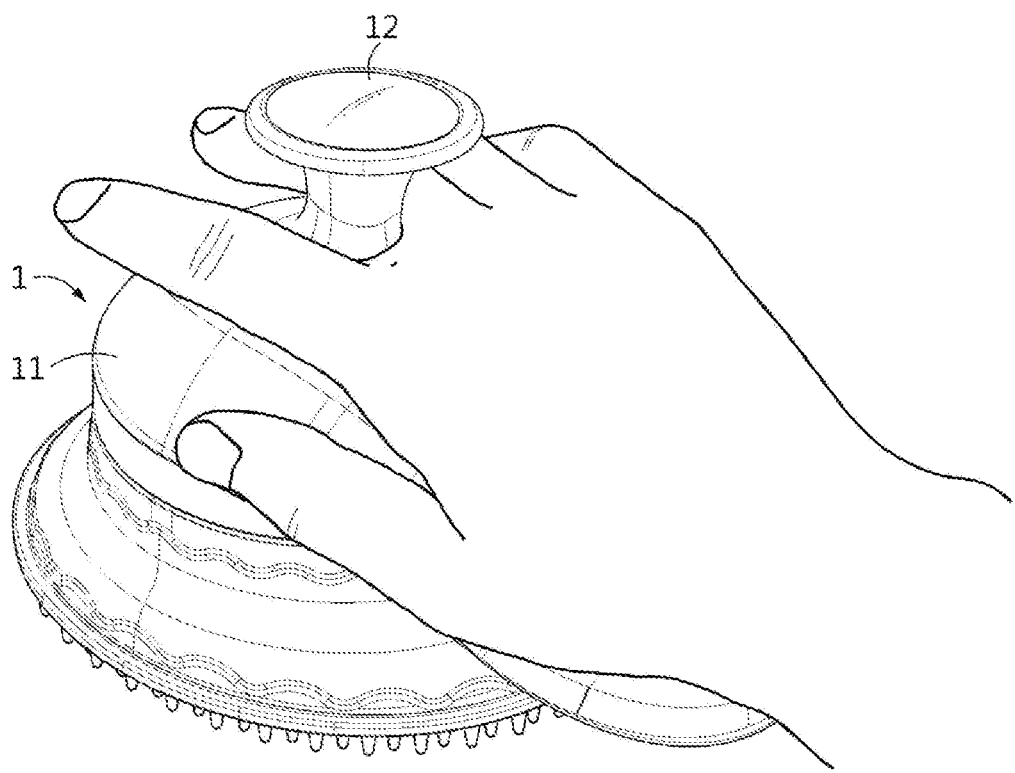
FIG. 5 is a use state diagram of the brush for pets according to one preferred embodiment of the present invention.
Figure 6:
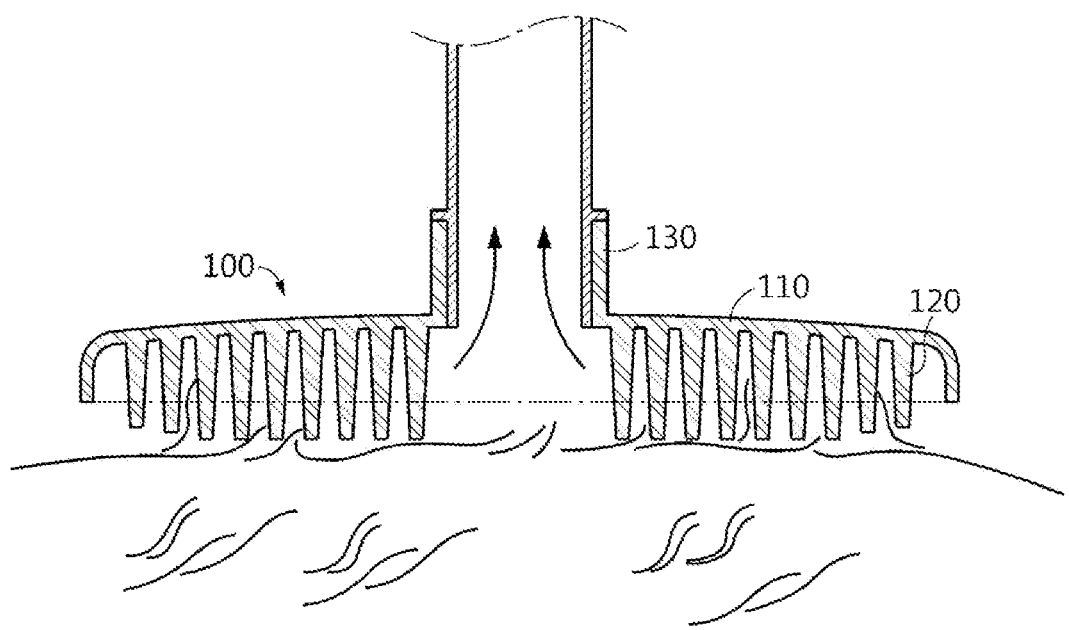
FIG. 6 is a cross-sectional view of a conventional brush for pets.
Figure 7:
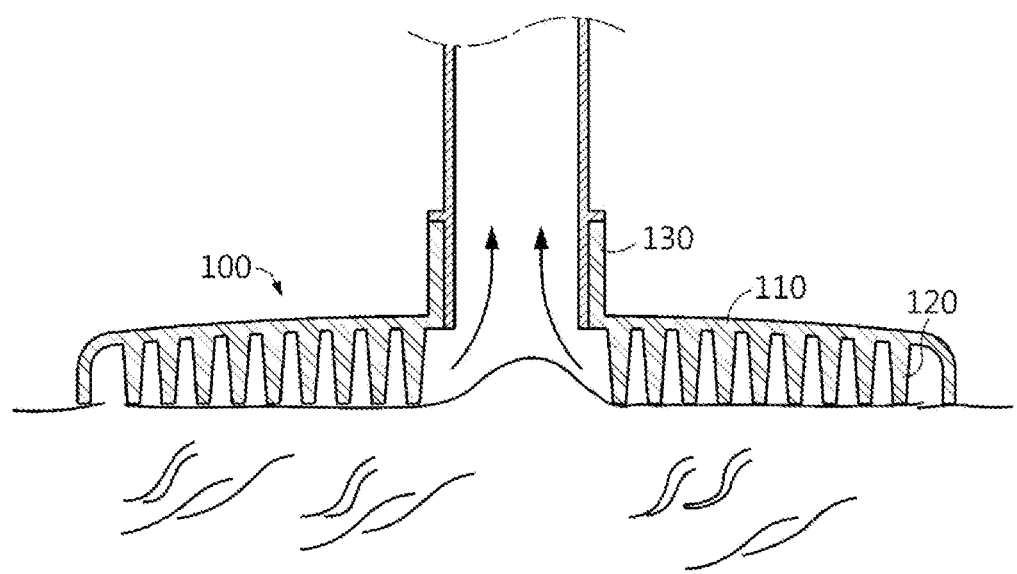
FIG. 7 is a cross-sectional view of another conventional brush for pets that is different from the one shown in FIG. 6.

A user who wants to manage his or her pet's hair using the brush 1 according to the present invention grasps the handle part 10 of the brush 1 as illustrated in FIG. 5. Here, the user's palm is adhered to the surface of the handle 11, and the user's index finger and middle finger are mounted on the fixed anchor 12 and fixed. While grasping the brush 1 in this way, the user brings the brush 1 into contact with the epidermis of the pet so that the end surface 57 of the cover part 55 of the brush shade 53 comes into contact with the epidermis of the pet and thus the closed space 58 is formed inside the brush shade 53. While the brush 1 is in contact with the epidermis of the pet in this way, when the brush 1 is pressed toward the epidermis of the pet as illustrated in FIG. 4, the cover part 55 of the brush shade 53 is pressed and widens outward, causing the first protrusions 51a of the comb teeth 51 to come into contact with the epidermis of the pet. In this state, the user moves the brush 1 to brush the pet hair. Here, the hair that falls off the epidermis due to being groomed by the comb teeth 51 and the first protrusions 51a is trapped inside the closed space 58 instead of falling out of the brush shade 53. After brushing is completed, the user removes the hair remaining in the closed space 58 to clean the brush 1. Thus, the amount of hair scattering to the surroundings due to brushing may be minimized.

Also, since the comb teeth 51, the first and second protrusions 51a and 56, and the brush shade 53 are all formed of a soft silicone material, a massage function may be maximized by properly inducing friction against the skin, etc. of the pet. That is, due to characteristics of the silicone material, when the comb teeth 51, the first and second protrusions 51a and 56, and the brush shade 53 rub against the skin, an appropriate level of compression is implemented as the comb teeth 51, the first and second protrusions 51a and 56, and the brush shade 53 are flexibly bent in a moving direction. Thus, a wider range of skin stimulation may be easily and conveniently induced without causing irritation, and since, unlike the conventional brushes made of a synthetic resin or the like, the brush 1 according to the present invention may be used regardless of a direction of texture during brushing, convenience is significantly improved.

The brush for pets according to the present invention have been expressed in the above description and drawings, but the description and drawings are only examples, and the spirit of the present invention is not limited thereto. Various alterations and changes may be possible within the scope not departing from the technical spirit of the present invention.

In addition, various substitutions, modifications, and changes are possible by those or ordinary skill in the art to which the present invention pertains within the scope not departing from the technical spirit of the present invention, and thus the spirit of the present invention is not limited by the embodiments described herein and the accompanying drawings.

What is claimed is:

1. A brush for pets which is a brush for grooming pet hair, the brush comprising:
    a handle part configured to be grasped by a user; and
    a brush part coupled to the handle part and configured to brush the pet hair,
    wherein the brush part comprises:
        a floor plate;
        a comb teeth array comprising a plurality of comb teeth, which are protruded from the floor plate; and
        a brush shade which is connected to the floor plate and configured to wrap around the comb teeth array,
    wherein a height of the brush shade is greater than a height of the comb teeth, and the brush shade is configured to form a closed space inside the brush shade when the brush shade is brought into contact with an epidermis of the pet to perform brushing,
    wherein each comb tooth of the plurality of comb teeth comprises a plurality of first protrusions, which are protruded from a distal end of a respective comb tooth,
    wherein the brush shade comprises a plurality of second protrusions on an end surface of the brush shade, and
    wherein:
    the brush shade wraps around the comb teeth array and is elliptical with a major axis and a minor axis, the major axis is a greater distance than the minor axis;
    a first group of the plurality of second protrusions has a first height;
    a second group of the plurality of second protrusions has a second height, which is shorter than the first height;
    the first group is positioned on a first circumferential portion and a second circumferential portion;
    the second group is positioned a third circumferential portion and a fourth circumferential portion;
    the first circumferential portion and the second circumferential portion are positioned on the major axis; and
    the third circumferential portion and the fourth circumferential are positioned on the minor axis.

2. The brush of claim 1, wherein the comb teeth, the plurality of first protrusions, the plurality of second protrusions, and the brush shade are made of a flexible material that is elastically deformable.

3. The brush of claim 2, wherein the brush shade comprises:
    a connecting part which extends from and is connected to the floor plate; and
    a cover part which extends from the connecting part, wraps around the comb teeth array, and expands with a progressively increasing diameter,
    wherein the plurality of second protrusions are formed on an end surface of the cover part, and
    wherein a height of the end surface of the cover part from the floor plate is greater than a height of the plurality of first protrusions from the floor plate.

4. The brush of claim 3, wherein the handle part comprises:
    a handle which is configured to be grasped by the user in a state in which the user's palm is placed thereon; and
    a fixed anchor which is configured to allow the user's hand placed on the handle to be adhered and fixed to the brush.

5. The brush of claim 4, wherein:
    the fixed anchor has a nail shape comprising a shank and a head; and
    the fixed anchor is configured to be held between an index finger and a middle finger of the user, which are placed on the handle.

6. The brush of claim 4, wherein the handle comprises an elongated shape configured to be held by the user's palm.

* * * * *